(12) United States Patent
Salter et al.

(10) Patent No.: US 11,390,334 B2
(45) Date of Patent: Jul. 19, 2022

(54) DEFLECTABLE ACTIVE AIR DAM ASSEMBLY AND ACTIVE AIR DAM LOAD RESPONSE METHOD

(71) Applicant: Ford Global Technologies, LLC, Dearborn, MI (US)

(72) Inventors: Stuart C. Salter, White Lake, MI (US); David Brian Glickman, Southfield, MI (US); Aaron Peter Klop, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 17/098,069

(22) Filed: Nov. 13, 2020

(65) Prior Publication Data

US 2022/0153356 A1    May 19, 2022

(51) Int. Cl.
*B62D 35/00* (2006.01)

(52) U.S. Cl.
CPC .................. *B62D 35/005* (2013.01)

(58) Field of Classification Search
CPC .............................. B62D 35/005; B62D 35/02
USPC ............................................ 296/180.2, 180.3
See application file for complete search history.

(56) References Cited

U.S. PATENT DOCUMENTS

| | | | | |
|---|---|---|---|---|
| 4,758,037 A * | 7/1988 | Suzuki | ................ | B62D 35/005 |
| | | | | 296/180.1 |
| 6,079,769 A | 6/2000 | Fannin et al. | | |
| 10,106,210 B2 | 10/2018 | Miller et al. | | |
| 10,124,839 B2 | 11/2018 | Povinelli et al. | | |
| 10,370,042 B2 * | 8/2019 | Bray | ...................... | B62D 35/02 |
| 10,953,933 B2 * | 3/2021 | Schmitt | ................ | B62D 35/005 |
| 11,155,312 B2 * | 10/2021 | Shiga | ..................... | B62D 37/02 |
| 11,161,557 B2 * | 11/2021 | Urbach | ................ | B62D 35/005 |
| 2020/0172058 A1 * | 6/2020 | Demetrio | .............. | F16D 65/847 |
| 2021/0061373 A1 * | 3/2021 | Guyon | ................... | B62D 35/02 |

FOREIGN PATENT DOCUMENTS

DE       102016202899 A1    4/2017
KR         100502145 B1    7/2005

* cited by examiner

*Primary Examiner* — Jason S Daniels
(74) *Attorney, Agent, or Firm* — Vichit Chea; Carlson, Gaskey & Olds, P.C.

(57) ABSTRACT

An active air dam assembly includes, among other things, an air dam configured to pivot relative to a vehicle bumper back and forth between a home position and a deflected position and an actuator system configured to transition the air dam vertically between a raised position and a deployed position.

20 Claims, 6 Drawing Sheets

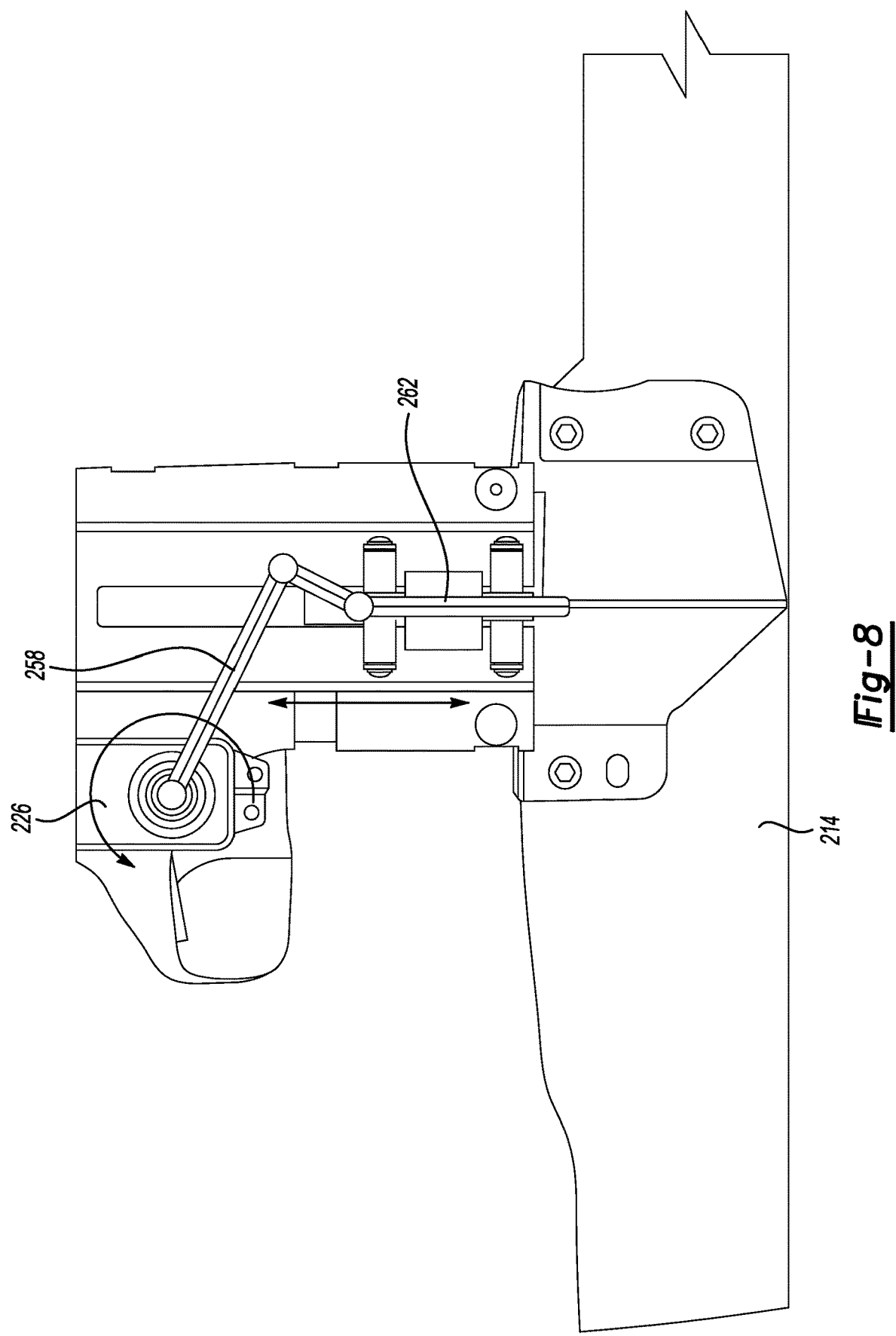

DEFLECTABLE ACTIVE AIR DAM ASSEMBLY AND ACTIVE AIR DAM LOAD RESPONSE METHOD

TECHNICAL FIELD

This disclosure relates generally to an active air dam for a vehicle and, more particularly, to an active air dam that deflects in response to an applied load and rebounds when the load is removed.

BACKGROUND

Some vehicles include an active air dam. The active air dam can be lowered and raised to manage airflow. The active air dam can be located at a front of a vehicle.

SUMMARY

An active air dam assembly according to an exemplary aspect of the present disclosure includes, among other things, an air dam configured to pivot relative to a vehicle bumper back and forth between a home position and a deflected position, and an actuator system configured to transition the air dam vertically between a raised position and a deployed position.

Another example of the foregoing assembly includes a trolley bracket that couples the air dam to a vehicle structure.

Another example of any of the foregoing assemblies includes a spring, a lower section of the trolley bracket, and an upper section of the trolley bracket. The lower section is connected directly to the air dam, and the upper section is directly connected to the vehicle structure. The lower section is pivotably coupled to the upper section, and the spring biases the lower section to bias the air dam toward the home position.

In another example of any of the foregoing assemblies, the air dam is aligned vertically beneath a front bumper of the vehicle when the air dam is in the home position.

In another example of any of the foregoing assemblies, at least some of the air dam is moved aft the front bumper when the active air dam is the deflected position.

In another example of any of the foregoing assemblies, the air dam is biased toward the home position.

Another example of any of the foregoing assemblies includes at least one spring that biases the air dam toward the home position.

In another example of any of the foregoing assemblies, the actuator system includes at least one screw drive.

In another example of any of the foregoing assemblies, the actuator system includes at least one gear rack that is driven by a pinon.

In another example of any of the foregoing assemblies, the actuator system includes at least one passenger side gear rack driven by a passenger side pinon and at least one driver side gear rack driven by a driver side pinion.

In another example of any of the foregoing assemblies, the at least one passenger side gear rack and at least one driver side gear rack are driven along respective vertically extending axes to transition the air dam vertically between the raised position and the deployed position.

In another example of any of the foregoing assemblies, the air dam is configured to pivot aftward and upward from the home position to the deflected position when a load above a threshold load is applied to a forward-facing surface of the air dam. The flap is configured to rebound from the deflected position to the home position when the load above the threshold load is no longer applied to the forward-facing surface of the air dam.

Another example of any of the foregoing assemblies includes an actuator and multi-link system. The actuator is configured to rotate to drive the multi-link system and transition the air dam between the raised position and the deployed position.

In another example of any of the foregoing assemblies, the actuator system comprises a radar chip.

An active air dam load response method includes, among other things, transitioning an active air dam between a raised position and a deployed position, and pivoting the active air dam relative to a bumper of a vehicle when a load above a threshold load is applied to the active air dam. The active air dam pivots from a home position to a defected position.

Another example of the foregoing method includes biasing the active air dam toward the home position such that the active air dam rebounds to the home position when the load is no longer applied to the active air dam.

In another example of any of the foregoing methods, the active air dam is more elevated when in the deflected position than the home position.

Another example of any of the foregoing methods includes driving a gear rack along a vertically extending axis to transition the active air dam between the raised position and the deployed position.

Another example of any of the foregoing methods includes rotating an actuator to drive a multi-link system and transition the air dam between the raised position and the deployed position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 8 illustrates a rear view of an active air dam according to yet another exemplary embodiment.

DETAILED DESCRIPTION

This disclosure details exemplary active air dam assemblies for a vehicle.

An air dam of the assembly can deflect when a load is applied to the air dam. The load could be due to the vehicle driving over an object particularly when the air dam is in a deployed position. Permitting the air dam to deflect can, among other things, help to avoid damage to the air dam.

Figure 1:
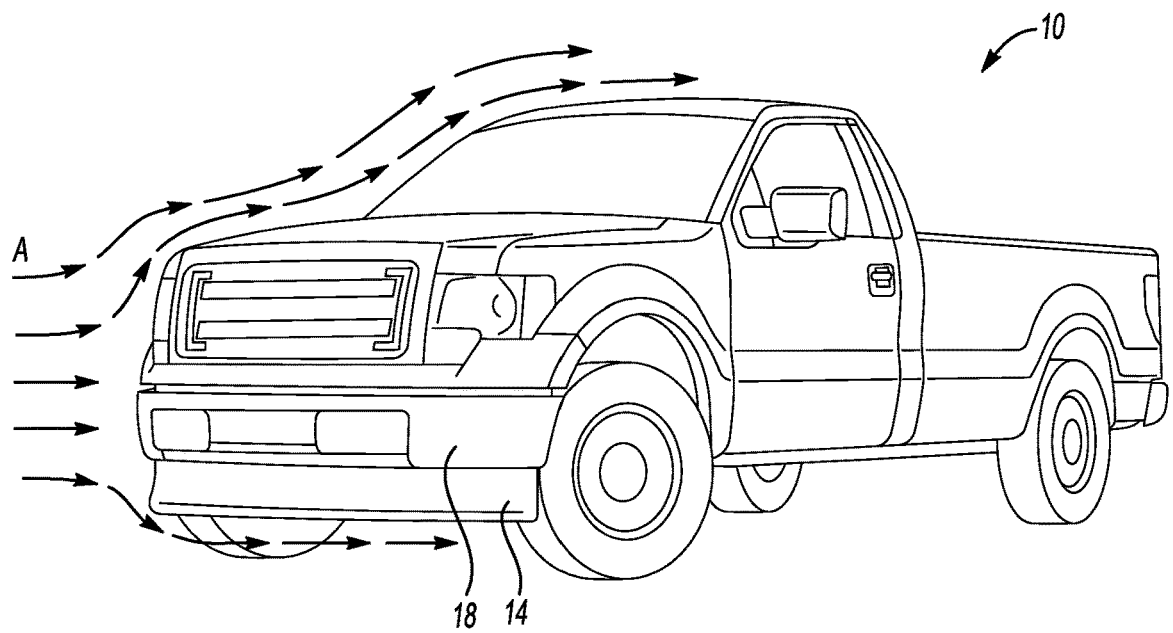
FIG. 1 illustrates a perspective view of a vehicle having an active air dam assembly according to an exemplary embodiment of the present disclosure.
Figure 2:
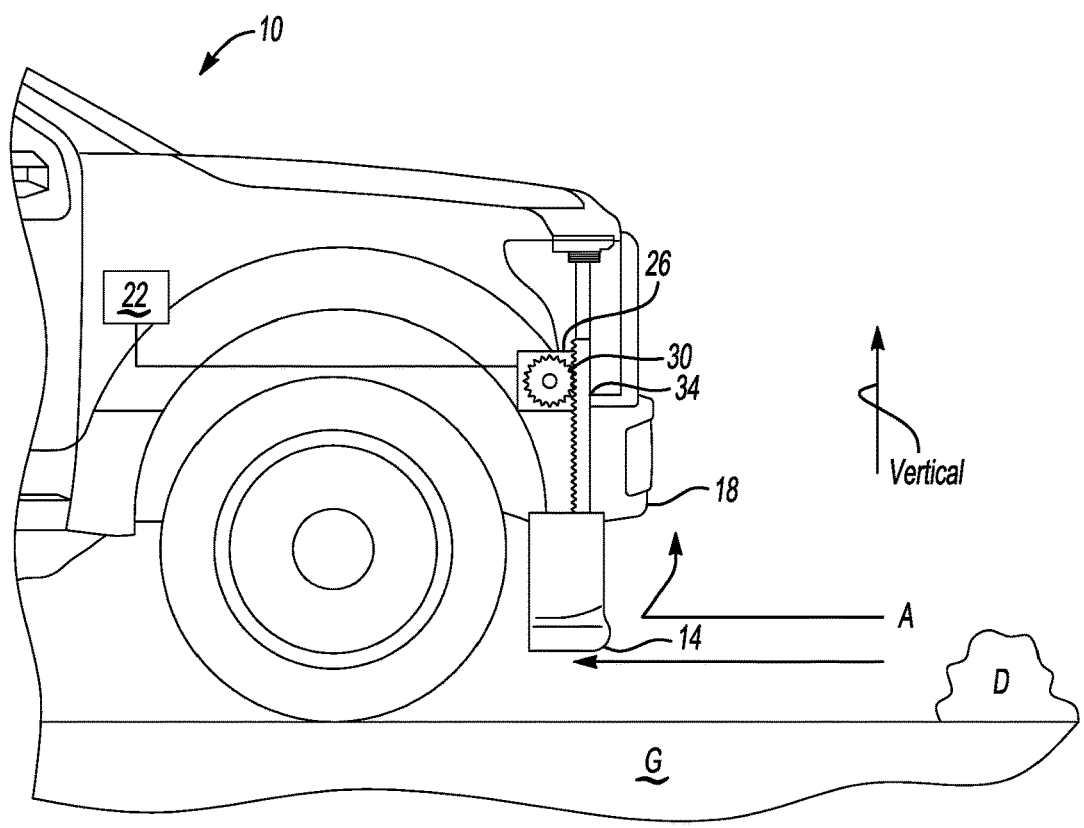
FIG. 2 illustrates a side view of a front portion of the vehicle of FIG. 1 showing an air dam of the assembly in an exemplary deployed position.

With reference to FIGS. 1 and 2, a vehicle 10 includes an air dam 14 vertically beneath a front bumper 18 of a vehicle 10. Vertical, for purposes of this disclosure, is with reference to the general orientation of the vehicle 10 as the vehicle 10 is driven over ground G.

In the exemplary embodiment, the air dam 14 extends continuously from a passenger side of the vehicle 10 to a driver side of the vehicle 10. In another example, the air dam 14 includes a first air dam portion on the passenger side and a second air dam portion on the driver side. The first and second air dam portions could be located, respectively, in front of a passenger side front wheel and a driver side front wheel of the vehicle 10. The first and second air dam portions could be independently controlled. That is, the first and second air dam portions could be raised and lowered independently from one another.

The air dam 14 is an active air dam that can be selectively raised and lowered. The air dam 14 can be automatically lowered when, for example, the vehicle 10 exceeds a certain speed. When the vehicle 10 slows below the certain speed, the air dam 14 is then retracted.

Figure 3:
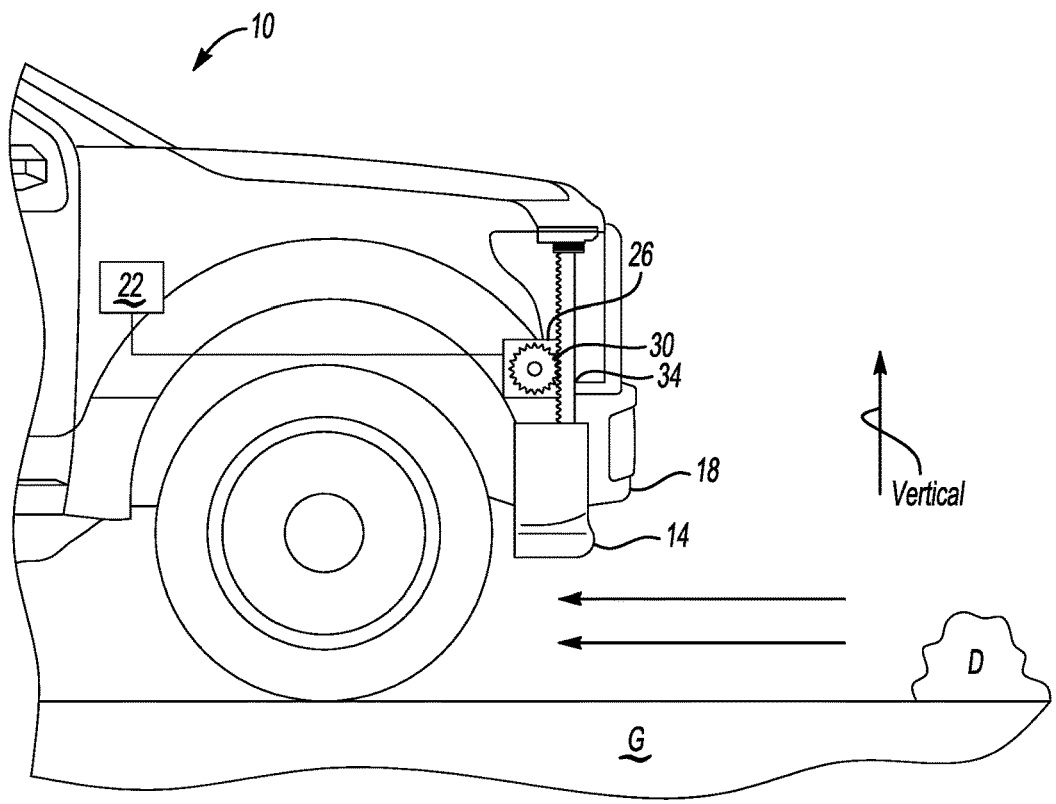
FIG. 3 illustrates the side view of FIG. 2, but shows the air dam in an exemplary raised position.

In FIGS. 1 and 2, the air dam 14 is shown in a deployed position. The air dam 14 extends vertically lower when in the deployed position than when in the raised position as shown in FIG. 3. The raised position can be a fully raised position, or fully retracted position, but that is not required. The deployed position can be a fully deployed position or a fully deployed position, but that is not required. The deployed position for the air dam 14 can be, for example, a position where the air dam 14 is lower than a previous position for the air dam 14. Similarly, the raised position of the air dam 14 can be a position where the air dam 14 is raised relative to a previous position of the air dam 14.

At some speeds, the vehicle 10 may operate more efficiently when airflow A beneath the vehicle 10 is reduced. Accordingly, it may be desirable to transition the air dam 14 to the deployed position when the vehicle 10 is operating at these speeds. When the air dam 14 is in the raised position and the vehicle 10 is driven, the air dam 14 does not block as much airflow A beneath the vehicle 10 as when the air dam 14 is in the deployed position.

As can be appreciated, the air dam 14 is closer to the ground G when the air dam 14 is in the deployed position than when the air dam 14 is in the raised position. The air dam 14 is thus more likely to contact the ground G when the air dam 14 is in the deployed position than when the air dam 14 is in the raised position. Further, the air dam 14 in the deployed position may be more likely to strike debris D on the ground G when the air dam 14 is in the deployed position.

Vehicle 10 includes an actuator system that transitions the air dam 14 vertically between the deployed position of FIGS. 1 and 2 and the raised position of FIG. 3. In the exemplary embodiment, the actuator system includes a control module 22, an actuator 26, a pinion 30, and a gear rack 34. The pinion 30 meshes with the gear rack 34. The gear rack 34 is connected to the air dam 14. In response to a command from the control module 22, the actuator 26 can rotate the pinion 30 to translate the gear rack 34 along a vertically extending axis.

As the air dam 14 is directly connected to the gear rack 34, translating the gear rack 34 downward moves the air dam 14 downward. Translating the gear rack 34 upward raises the air dam 14. The actuator 26, notably, rotates the pinion 30 about a horizontally extending axis, which extends perpendicular to the plane of the page in FIGS. 2 and 3.

In another example, the actuator system incorporates a screw drive. An actuator rotates about a vertically extending axis to moves a screw vertically upward or downward and raise or lower the air dam 14.

Using the gear rack 34 rather than the screw, and rotating the actuator 26 about a horizontally extending axis rather than, for example, a vertically extending axis can better facilitate packaging the actuation system within the vehicle 10.

In some examples, the actuator 26 could include a radar chip that is utilized to estimate the speed of the vehicle 10, to scan for obstructions in the road, or both. The control module 22 can then raise or lower the air dam 14 based on the estimated speed or the detection of obstructions without relying on sensors elsewhere on the vehicle 10.

The actuator 26 could then further include a Bluetooth Low Energy transmitter/antenna to facilitate communication between the actuator 26 and other areas of the vehicle 10 without hardwiring.

Figure 4:
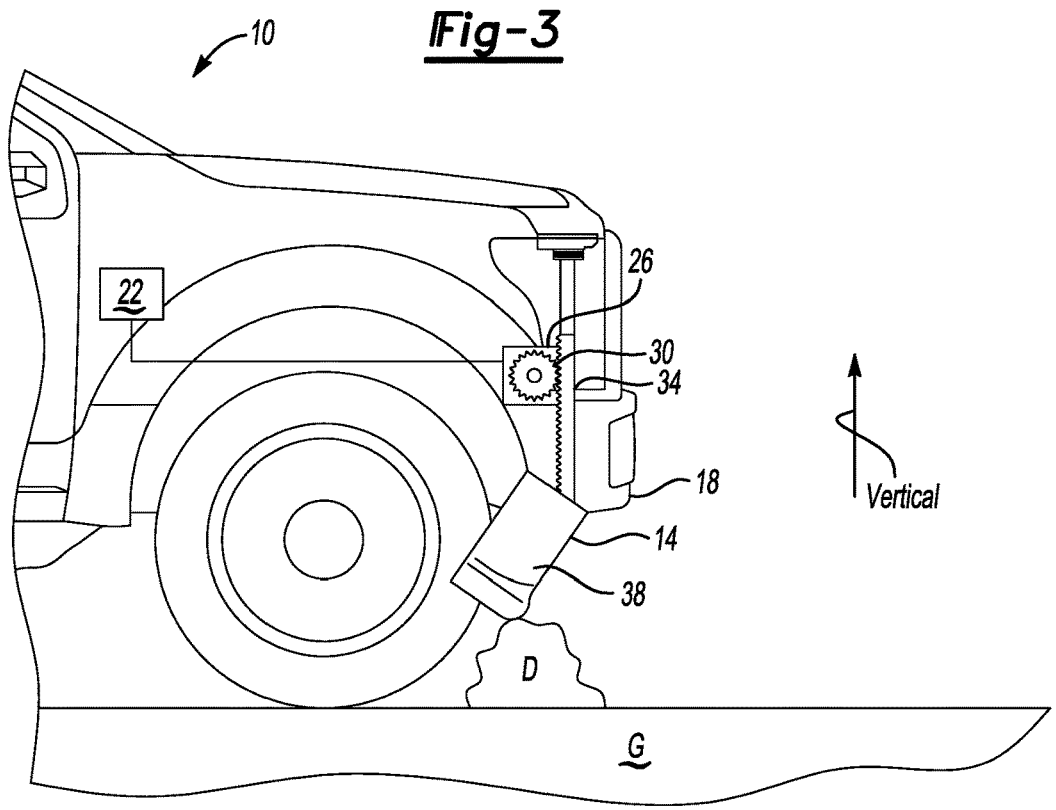
FIG. 4 illustrates the side view of FIG. 3 showing the air dam in a deflected position where the air dam has pivoted away from a home position shown in FIG. 3.

With reference now to FIG. 4, the air dam 14 is in the deployed position of FIGS. 1 and 2 and the vehicle 10 has been driven forward such that the air dam 14 has contacted the debris D on the ground G. As the vehicle 10 is driven over the debris D, the debris D contacts a forward-facing surface 38 of the air dam 14. Moving the air dam 14 against the debris D exerts a load on the air dam 14.

In response to the load applied to the forward-facing surface 38, the air dam 14 pivots aftward and upward from the home position of FIGS. 1 and 2 to a deflected position shown in FIG. 4. The air dam is thus a deflectable air dam.

When the air dam 14 is in the deflected position, the vehicle 10 can drive over the debris D without damage to the air dam 14. After the air dam 14 passes over the debris D, the air dam 14 rebounds back to the home position shown in FIGS. 1 and 2.

In some examples, the area in front of the vehicle 10 can be continually scanned for debris using sensors, such as Advanced Driver Assistance Systems (ADAS) sensors. If debris are detected, the air dam 14 can be retracted. The debris may not always be detected, however, or the air dam 14 may not be able to retract fast enough to avoid contact with the debris.

For purposes of this disclosure, the position of the air dam 14 shown in FIGS. 1-3 is considered a home or design position. When the air dam 14 is pivoted away from the home position, the air dam 14 is considered to be in the deflected position. When the air dam 14 is in the home position of FIGS. 1-3, the air dam 14 is substantially aligned vertically and disposed vertically beneath the front bumper 18. When the air dam 14 has been pivoted to the deflected position of FIG. 4, at least some of the air dam 14 is moved aft of the front bumper 18. The air dam 14 is configured to pivot relative to the front bumper 18 and other portions of the vehicle 10, back and forth between the home position of FIGS. 1-3 and the deflected position.

In the exemplary embodiment, a biasing device is used to bias the air dam 14 such that the air dam 14 returns or rebounds to the home position of FIGS. 1-3 when the load is no longer applied to the forward-facing surface 38 of the air dam 14. The biasing device can be one or more springs, for example.

Figure 5:
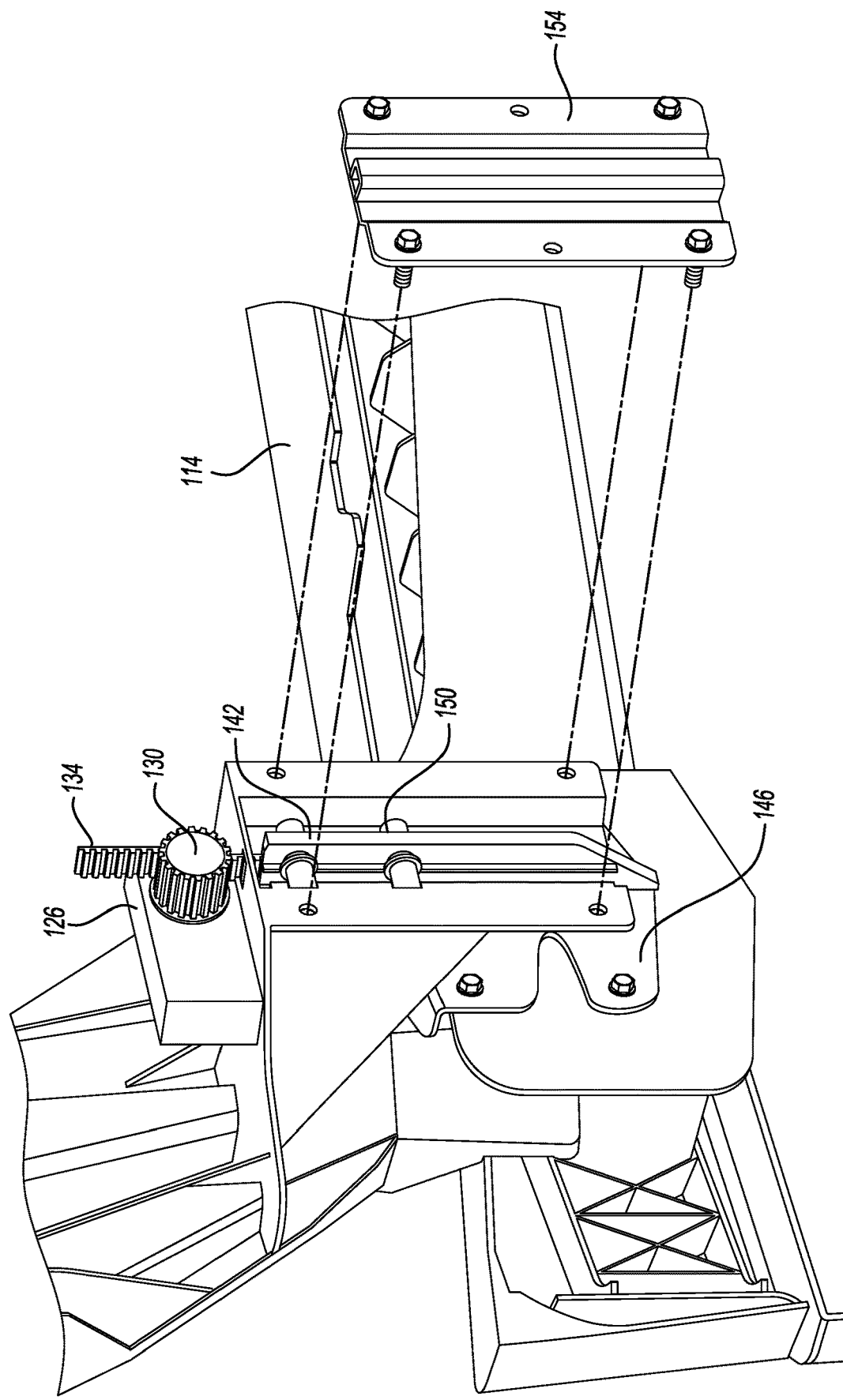
FIG. 5 illustrates a perspective view of a portion of an active air dam assembly according to another exemplary embodiment of the present disclosure.

With reference to FIG. 5, a portion of another example air dam 114 is shown along with an actuator system. In the FIG.

5 embodiment, the actuator system includes an actuator 126 that rotates a pinion 130 to translate a gear rack 134 vertically. Translating the gear rack can move the air dam 114 vertically between the raised position and the deployed position. The actuator 126, pinion 130 and gear rack 134 are on a driver side of the vehicle. The actuator system further includes passenger side actuator, pinion, and gear rack. The actuator 126 in the embodiment of FIG. 5 rotates the pinion 130 about a horizontal axis, but the axis is directed along the longitudinal length of the vehicle.

Figure 6:
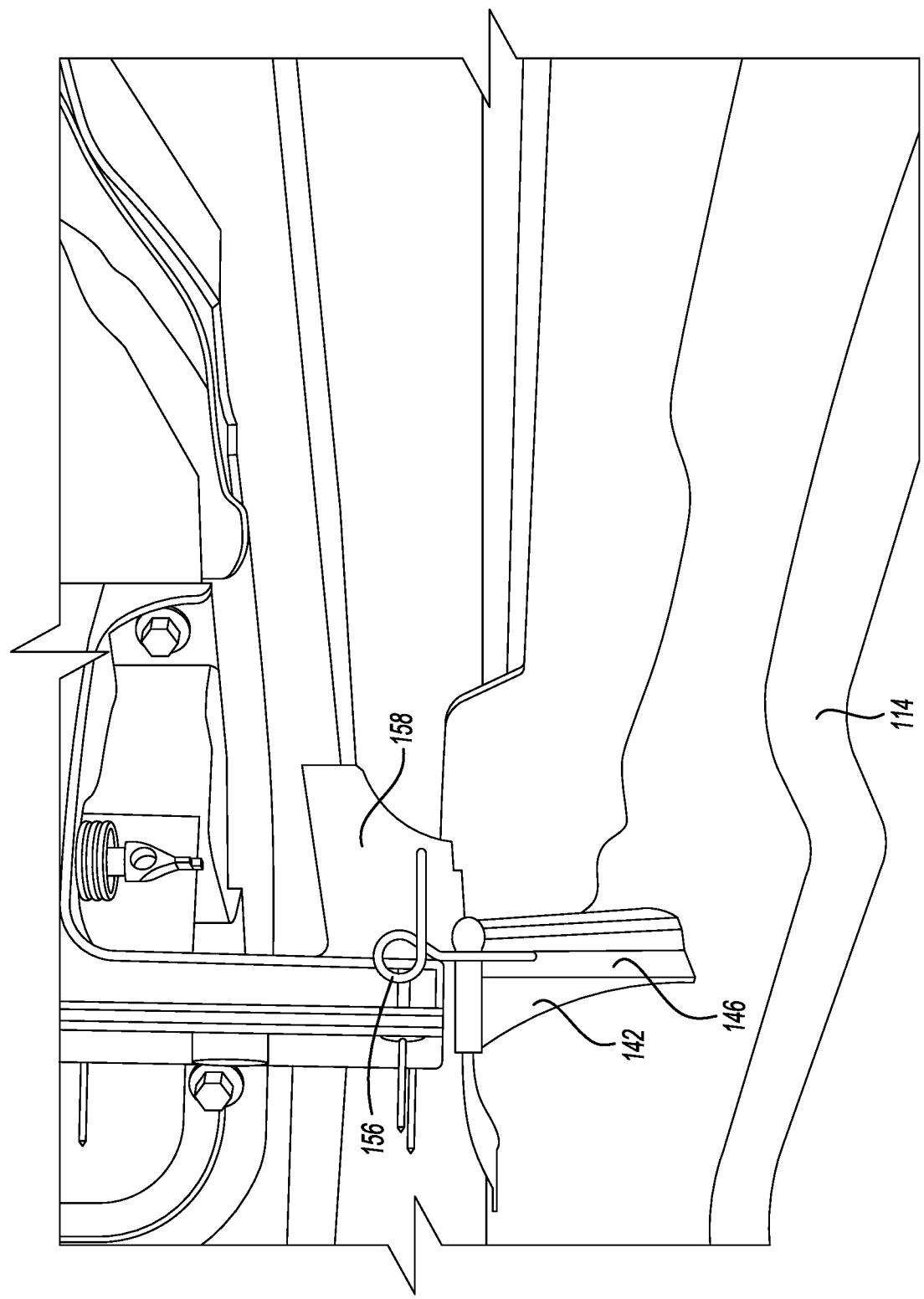
FIG. 6 illustrates another perspective view of the portion of the active air dam assembly shown FIG. 5.
Figure 7:
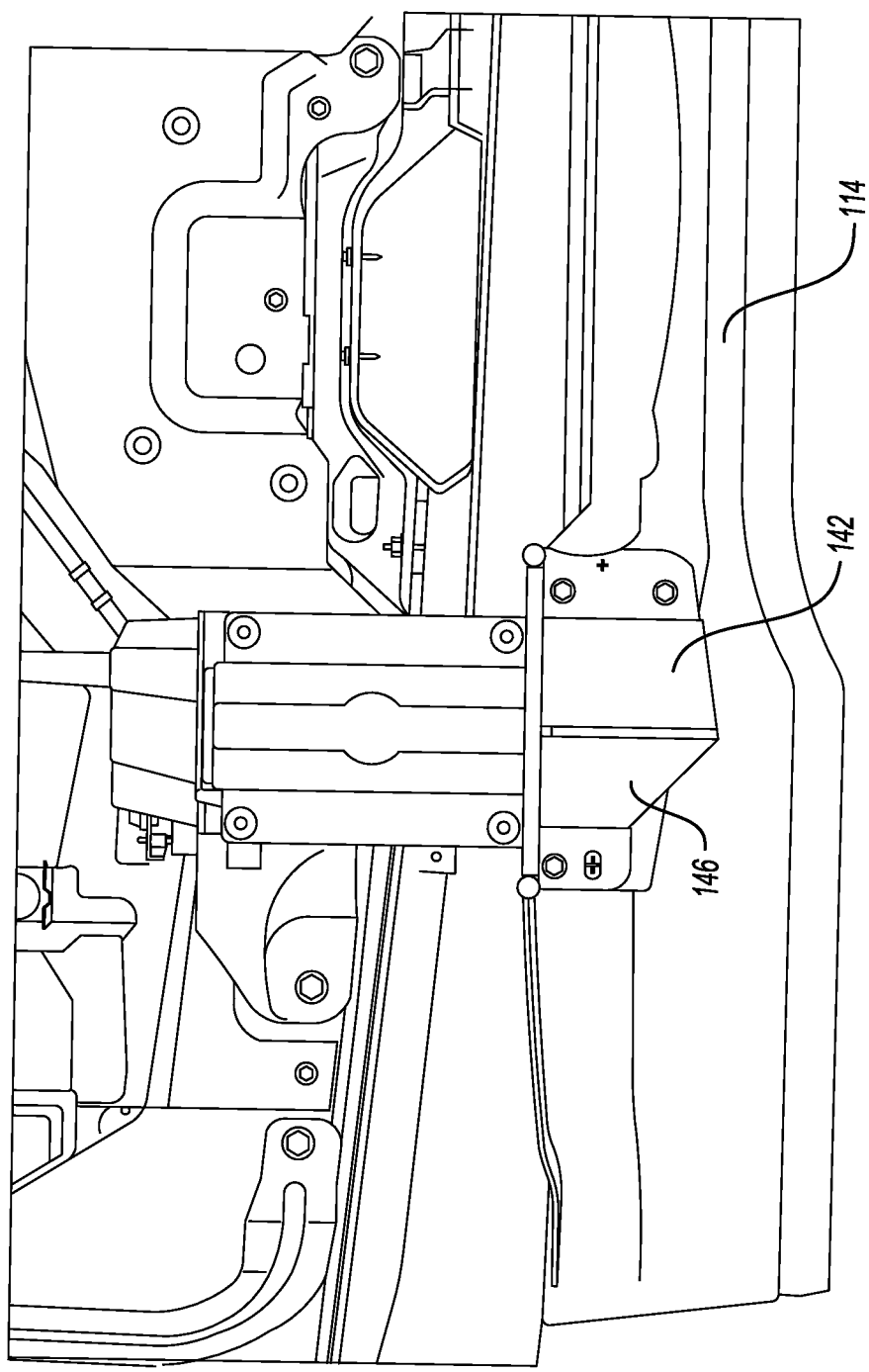
FIG. 7 illustrates a rear view of the portion of the active air dam shown in FIG. 5.

With reference now to FIGS. 6 and 7 and continuing reference to FIG. 5, a trolley bracket 142 couples the gear rack 134 to the air dam 114. The trolley bracket 142 includes, in the exemplary embodiment, a lower section 146 directly connected to the back side of the air dam 114, and an upper section 150 directly connected to the gear rack 134. A cover 154 can be secured to the structures surrounding the gear rack 134 and the upper section 150 to protect selected portions of the gear rack 34 and the upper section 150 of the trolley bracket 142.

In this example, the lower section 146 of the trolley bracket 142 is pivotably coupled to the upper section 150 of the trolley bracket 142. The trolley bracket 142 couples the air dam 114 to a vehicle structure, here, an underbody structure of the vehicle. A spring 158 biases the lower section 146 of the trolley bracket 142 into the position of FIGS. 5-7. The spring 158 is a clock spring in some examples.

When a load above a threshold load is applied to a forward-facing surface of the air dam 114, such as a load resulting from the vehicle driving over debris, the lower section 146 pivots relative to the upper section 150 to permit movement of the air dam 114 from the home position to a deflected position.

The threshold load is the load sufficient to overcome the biasing force exerted by the spring 158, which tends to rebound and bias the air dam 114 toward the home position. When the load is removed, the spring 158 forces the lower section 146 to pivot the air dam 114 back to the home position of FIGS. 5-7.

FIG. 8 shows another exemplary embodiment of an air dam 214 that is moved between a raised and a deployed position utilizing an actuator system. The actuator system includes a rotary actuator 226 and a multi-link system 258.

The rotary actuator 226 can rotate to drive the multi-link system 258, which can then raise and lower a slider 262 to move the air dam 214 between the raised position and the deployed position. The rotary actuator 226 and multi-link system 258 are on a driver side. The actuator system can further include another rotary actuator and multi-link system on a passenger side. The actuator system utilizing the rotary actuator 226 and the multi-link system 258 can be utilized in particular situations where rotary actuators configured to rotate about vertically extending axes are difficult to package, for example.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An active air dam assembly, comprising:
    an air dam configured to pivot relative to a vehicle bumper back and forth between a home position and a deflected position;
    an actuator system configured to transition the air dam vertically between a raised position and a deployed position,
    a bracket that couples the air dam to a vehicle structure, the bracket having an upper section pivotably coupled to a lower section.
2. The active air dam assembly of claim 1, wherein the air dam is aligned vertically beneath a front bumper of the vehicle when the air dam is in the home position.
3. The active air dam assembly of claim 2, wherein at least some of the air dam is moved aft the front bumper when the active air dam is the deflected position.
4. The active air dam assembly of claim 1, wherein the air dam is biased toward the home position.
5. The active air dam assembly of claim 4, further comprising at least one spring that biases the air dam toward the home position.
6. The active air dam assembly of claim 1, wherein the actuator system includes at least one screw drive.
7. The active air dam assembly of claim 1, wherein the actuator system includes at least one gear rack that is driven by a pinon.
8. The active air dam assembly of claim 1, wherein the actuator system includes at least one passenger side gear rack driven by a passenger side pinon and at least one driver side gear rack driven by a driver side pinion.
9. The active air dam assembly of claim 8, wherein the at least one passenger side gear rack and at least one driver side gear rack are driven along respective vertically extending axes to transition the air dam vertically between the raised position and the deployed position.
10. The active air dam assembly of claim 1, wherein the air dam is configured to pivot aftward and upward from the home position to the deflected position when a load above a threshold load is applied to a forward facing surface of the air dam, wherein the flap is configured to rebound from the deflected position to the home position when the load above the threshold load is no longer applied to the forward facing surface of the air dam.
11. The active air dam assembly of claim 1, further comprising an actuator and multi-link system, the actuator configured to rotate to drive the multi-link system and transition the air dam between the raised position and the deployed position.
12. The active air dam assembly of claim 1, wherein the actuator system comprises a radar chip.
13. The active air dam assembly of claim 1, wherein the bracket is a trolley bracket.
14. An active air dam assembly, comprising:
    an air dam configured to pivot relative to a vehicle bumper back and forth between a home position and a deflected position;
    an actuator system configured to transition the air dam vertically between a raised position and a deployed position;
    a trolley bracket that couples the air dam to a vehicle structure; and
    a spring, a lower section of the trolley bracket, and an upper section of the trolley bracket, wherein the lower section is connected directly to the air dam, and the upper section is directly connected to the vehicle structure, wherein the lower section is pivotably coupled to the upper section, and the spring biases the lower section to bias the air dam toward the home position.
15. An active air dam load response method, comprising:
    transitioning an active air dam between a raised position and a deployed position;

pivoting the active air dam relative to a bumper of a vehicle when a load above a threshold load is applied to the active air dam, the active air dam pivoting from a home position to a defected position; and during the pivoting, pivoting a lower section of a bracket relative to an upper section of the bracket, the bracket coupling the air dam to a vehicle structure.

16. The method of claim 15, further comprising biasing the active air dam toward the home position such that the active air dam rebounds to the home position when the load is no longer applied to the active air dam.

17. The method of claim 15, wherein active air dam is more elevated when in the deflected position than the home position.

18. The method of claim 15, further comprising driving a gear rack along a vertically extending axis to transition the active air dam between the raised position and the deployed position.

19. The method of claim 15, further comprising rotating an actuator to drive a multi-link system and transition the air dam between the raised position and the deployed position.

20. The method of claim 15, wherein the bracket is a trolley bracket.

\* \* \* \* \*

UNITED STATES PATENT AND TRADEMARK OFFICE
CERTIFICATE OF CORRECTION

PATENT NO. : 11,390,334 B2
APPLICATION NO. : 17/098069
DATED : July 19, 2022
INVENTOR(S) : Stuart C. Salter, David Brian Glickman and Aaron Peter Klop It is certified that error appears in the above-identified patent and that said Letters Patent is hereby corrected as shown below:

In the Claims

In Claim 2, Column 6, Line 8-9; replace "the vehicle" with --a vehicle--

In Claim 3, Column 6, Line 12; replace "is the deflected position" with --is in the deflected position--

In Claim 10, Column 6, Line 36; replace "the flap" with --the air dam--

In Claim 15, Column 7, Line 4; replace "defected position" with --deflected position--

In Claim 17, Column 7, Line 12; replace "wherein active air dam" with --wherein the active air dam--

Signed and Sealed this
Twentieth Day of September, 2022

Katherine Kelly Vidal
*Director of the United States Patent and Trademark Office*